| (12) | United States Patent | (10) Patent No.: | US 9,951,866 B2 |
|---|---|---|---|
| | Kuwahara et al. | (45) Date of Patent: | Apr. 24, 2018 |

(54) SHIFT APPARATUS

(71) Applicant: Aisin Seiki Kabushiki Kaisha, Kariya-shi (JP)

(72) Inventors: Shinya Kuwahara, Toyota (JP); Yutaka Uchida, Toyota (JP); Shinya Horii, Komaki (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 296 days.

(21) Appl. No.: 14/876,991

(22) Filed: Oct. 7, 2015

(65) Prior Publication Data

US 2016/0102761 A1    Apr. 14, 2016

(30) Foreign Application Priority Data

Oct. 8, 2014   (JP) ................................ 2014-206883

(51) Int. Cl.
| F16H 61/32 | (2006.01) |
| F16H 61/24 | (2006.01) |
| F16H 61/28 | (2006.01) |

(52) U.S. Cl.
CPC ............. *F16H 61/32* (2013.01); *F16H 61/24* (2013.01); *F16H 61/28* (2013.01); *F16H 2061/247* (2013.01); *F16H 2061/283* (2013.01); *F16H 2061/326* (2013.01)

(58) Field of Classification Search
CPC .......... F16H 61/24; F16H 61/28; F16H 61/32; F16H 2061/247; F16H 2061/283; F16H 2061/326
USPC ............................................ 74/335, 473.12
See application file for complete search history.

(56) References Cited

U.S. PATENT DOCUMENTS

| 7,845,248 B2 | 12/2010 | Yoshiyama et al. |
| 8,789,643 B2 | 7/2014 | Iwami et al. |
| 2006/0103339 A1 | 5/2006 | Yamada et al. |
| 2007/0046243 A1 | 3/2007 | Hori et al. |

FOREIGN PATENT DOCUMENTS

| JP | 7-81448 A | 3/1995 |
| JP | 7-310820 | 11/1995 |
| JP | 3692791 | 9/2005 |

(Continued)

OTHER PUBLICATIONS

Extended European Search Report dated Feb. 24, 2016 in Patent Application No. 15188782.5.

*Primary Examiner* — William C Joyce

(74) *Attorney, Agent, or Firm* — Oblon, McClelland, Maier & Neustadt, L.L.P.

(57) ABSTRACT

A shift apparatus mounted on a vehicle includes: a shift switching member including valley sections according to a shift position; a positioning member provided to establish the shift position in a state of being fitted into any of the valley sections; an actuator for driving the shift switching member; and a driving force transmission mechanism including a driving-side member on an actuator side and a driven-side member on a shift switching member side, and rotating the shift switching member, wherein the driving-side and driven-side members are able to relatively rotate in an engaged state by a predetermined amount of backlash, and a position of a valley bottom of the valley section is configured to be learned, based on a difference between rotational angles on the actuator side and the shift switching member side.

4 Claims, 11 Drawing Sheets

(56) References Cited

FOREIGN PATENT DOCUMENTS

| | | |
|---|---|---|
| JP | 3840368 | 11/2006 |
| JP | 2006-336680 A | 12/2006 |
| JP | 2008-2508 | 1/2008 |
| JP | 2009-144794 | 7/2009 |
| JP | 2013-194855 | 9/2013 |

FIG.10

LEARNING PROCEDURE OF POSITION OF VALLEY BOTTOM WITHIN VALLEY SECTION (FITTING SECTION) REGARDING D POSITION

| INFORMATION OF ROTOR ROTATIONAL ANGLE SENSOR | HALL IC HA | L | H | H | H | L | L | L | H | H | H | L | L | L | H | H | H | L | L | L | H | H | H | L | L | L | H | H | H | L | L |
|---|---|---|---|---|---|---|---|---|---|---|---|---|---|---|---|---|---|---|---|---|---|---|---|---|---|---|---|---|---|---|---|
| | HALL IC HB | L | L | H | H | H | L | L | L | H | H | H | L | L | L | H | H | H | L | L | L | H | H | H | L | L | L | H | H | H | L | L |
| | HALL IC HC | H | H | H | L | L | L | H | H | H | L | L | L | H | H | H | L | L | L | H | H | H | L | L | L | H | H | H | L | L | L | H |
| | PATTERN NUMBER | 4 | 3 | 2 | 1 | 6 | 5 | 4 | 3 | 2 | 1 | 6 | 5 | 4 | 3 | 2 | 1 | 6 | 5 | 4 | 3 | 2 | 1 | 6 | 5 | 4 | 3 | 2 | 1 | 6 | 5 | 4 |
| | COUNT VALUE | 21 | 20 | 19 | 18 | 17 | 16 | 15 | 14 | 13 | 12 | 11 | 10 | 9 | 8 | 7 | 6 | 5 | 4 | 3 | 2 | 1 | 1 | 2 | 3 | 4 | 5 | 6 | 7 | 8 | 9 | 10 | 11 | 12 | 13 | 14 | 15 |

VOLTAGE LEVEL OF OUTPUT SHAFT ROTATIONAL ANGLE SENSOR

| ENGAGEMENT STATE OF INTERMEDIATE GEAR IN SPEED REDUCTION MECHANISM SECTION | MOTOR IS ROTATED TO ROTATE DETENT PLATE | DETENT PLATE IS ROTATED PRIOR TO ROTATION OF MOTOR | ROLLER SECTION OF DETENT SPRING IS FITTED INTO VALLEY BOTTOM OF VALLEY SECTION | MOTOR CATCHES UP AND ROTATES DETENT PLATE | MOTOR ROTATES IN REVERSE DIRECTION AND ROLLER SECTION STARTS TO FALL INTO VALLEY SECTION AGAIN | ROLLER SECTION OF DETENT SPRING IS FITTED INTO VALLEY BOTTOM OF VALLEY SECTION AGAIN |

PORTION HAVING FLATNESS (FIRST TIME)     PORTION HAVING FLATNESS (SECOND TIME)

STATE OF ROLLER SECTION IN DETENT PLATE

FIG. 11

LEARNING PROCEDURE OF POSITION OF VALLEY BOTTOM WITHIN VALLEY SECTION (FITTING SECTION) REGARDING D POSITION (CONTINUED FROM FIG. 10)

| INFORMATION OF ROTOR ROTATIONAL ANGLE SENSOR | HALL IC HA | L | L | L | H | H | H | L | L | L | H | H | H | L | L | L | H | H | H | L | L | L | H | H | H | L |
|---|---|---|---|---|---|---|---|---|---|---|---|---|---|---|---|---|---|---|---|---|---|---|---|---|---|---|
| | HALL IC HB | H | H | L | L | L | H | H | H | L | L | L | H | H | H | L | L | L | H | H | H | L | L | L | H | H |
| | HALL IC HC | H | L | L | L | H | H | H | L | L | L | H | H | H | L | L | L | H | H | H | L | L | L | H | H | H |
| | PATTERN NUMBER | 5 | 6 | 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 |
| | COUNT VALUE | 16 | 17 | 18 | 17 | 16 | 15 | 14 | 13 | 12 | 11 | 10 | 9 | 8 | 7 | 6 | 5 | 4 | 3 | 2 | 1 | 6 | 5 | 4 | 3 | 2 |

Additional columns continue: 1 | 6 | 5 | 4 | 3 | 2 | 1 | 6 ... 11 12 13 14 15

Count value 10 is boxed → INTERMEDIATE COUNT VALUE IS DETERMINED AS POSITION OF VALLEY BOTTOM VOLTAGE LEVEL OF OUTPUT SHAFT ROTATIONAL ANGLE SENSOR:
- PORTION HAVING FLATNESS (THIRD TIME)
- PORTION HAVING FLATNESS (FOURTH TIME)

ENGAGEMENT STATE OF INTERMEDIATE GEAR IN SPEED REDUCTION MECHANISM SECTION:

| MOTOR CATCHES UP AND ROTATES DETENT PLATE | MOTOR ROTATES IN REVERSE DIRECTION AND ROLLER SECTION STARTS TO FALL INTO VALLEY SECTION AGAIN | ROLLER SECTION OF DETENT SPRING IS FITTED INTO VALLEY BOTTOM OF VALLEY SECTION AGAIN | MOTOR CATCHES UP AND ROTATES DETENT PLATE | MOTOR ROTATES IN REVERSE DIRECTION AND ROLLER SECTION STARTS TO FALL INTO VALLEY SECTION AGAIN | ROLLER SECTION OF DETENT SPRING IS FITTED INTO VALLEY BOTTOM OF VALLEY SECTION AGAIN |

21 22 21e 22e

STATE OF ROLLER SECTION IN DETENT PLATE:
- POSITION V / POSITION A / B (85, 73, 71)
- POSITION V / POSITION A / B (85, 73)
- POSITION N / POSITION D / A / B (73)
- POSITION V / POSITION A / B (85, 73)
- POSITION V / POSITION A / B (85, 73)
- POSITION N / POSITION D / A / B (73, 71)

SHIFT APPARATUS

CROSS REFERENCE TO RELATED APPLICATIONS

This application is based on and claims priority under 35 U.S.C. § 119 to Japanese Patent Application 2014-206883, filed on Oct. 8, 2014, the entire contents of which are incorporated herein by reference.

TECHNICAL FIELD

This disclosure relates to a shift apparatus mounted on a vehicle.

BACKGROUND DISCUSSION

In the related art, a shift-by-wire type shift apparatus, which electrically switches a shift state based on a shift operation performed by an occupant (driver), is known (for example, see JP 2013-194855A (Reference 1)).

A shift control apparatus (the shift apparatus) including an actuator that is operated based on a control signal corresponding to the shift operation performed by the occupant and a shift switching mechanism (shift switching member) that switches a shift position by being driven by the actuator is disclosed in Reference 1. In the shift control apparatus described in Reference 1, four fitting sections (valley sections) are continued at an edge of a detent plate. Then, a leading end portion of a detent spring is fitted into one fitting section together with rotation of the detent plate by the actuator and thereby the shift position corresponding to the fitting section is established. Moreover, a wall section having an inclined angle at which the leading end portion of the detent spring cannot climb over is provided in the fitting sections (valley sections) of both end portions. Thus, after a rotation starting point of the detent plate is set by pressing the leading end portion of the detent spring against the wall section of the detent plate, the detent plate is configured to be rotated to a position corresponding to each shift position by a rotational angle that is set in advance.

However, in the shift control apparatus (shift apparatus) of Reference 1, whenever the leading end portion of the detent spring is pressed against the wall section of the detent plate by rotating the detent plate, a lock torque is generated in the actuator. In addition, an excessive pressing force is applied to both the wall section of the detent plate and the leading end portion of the detent spring together with generation of the lock torque. Thus, there is a problem in that durability of the actuator and the shift switching mechanism is lowered according to the learning of the rotation starting point of the detent plate being repeatedly performed. In addition, since the detent plate is rotated to the position corresponding to each shift position by the rotational angle that is set in advance after learning of the rotation starting point, there is a problem that the leading end portion of the detent spring is not accurately fitted into a valley bottom of each fitting section and positioning accuracy of each shift position is lowered due to individual differences (manufacturing errors and the like) of each shift apparatus.

SUMMARY

Thus, a need exists for a shift apparatus which is not suspectable to the drawback mentioned above.

A shift apparatus according to one aspect of this disclosure is a shift apparatus mounted on a vehicle and includes a shift switching member that includes a plurality of valley sections according to a shift position; a positioning member that is provided to establish the shift position in a state of being fitted into any one of the plurality of valley sections of the shift switching member; an actuator for driving the shift switching member; and a driving force transmission mechanism that includes a driving-side member that is provided on an actuator side and a driven-side member that is provided on a shift switching member side and is rotated according to rotation of the driving-side member, and rotates the shift switching member by transmitting a driving force from the actuator side. The driving-side member and the driven-side member are configured to be able to relatively rotate in an engaged state by a predetermined amount of backlash by providing the predetermined amount of backlash between the driving-side member and the driven-side member, and a position of a valley bottom of the valley section into which the positioning member is fitted is configured to be learned, based on a difference between a rotational angle on the actuator side which is generated due to the predetermined amount of backlash, and a rotational angle on the shift switching member side.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a view specifically describing a learning procedure of the position of the valley bottom of the valley section of the detent plate in the shift apparatus according to one embodiment of this disclosure; and FIG. 11 is a view specifically describing the learning procedure of the position of the valley bottom of the valley section of the detent plate in the shift apparatus according to one embodiment of this disclosure;

DETAILED DESCRIPTION

Hereinafter, an embodiment of this disclosure will be described with reference to the drawings.

First, a configuration of a shift apparatus 100 according to one embodiment of this disclosure will be described with reference to FIGS. 1 to 9. Hereinafter, after a schematic configuration of the shift apparatus 100 is described, a detailed configuration of an actuator unit 60 will be described.

Figure 1:
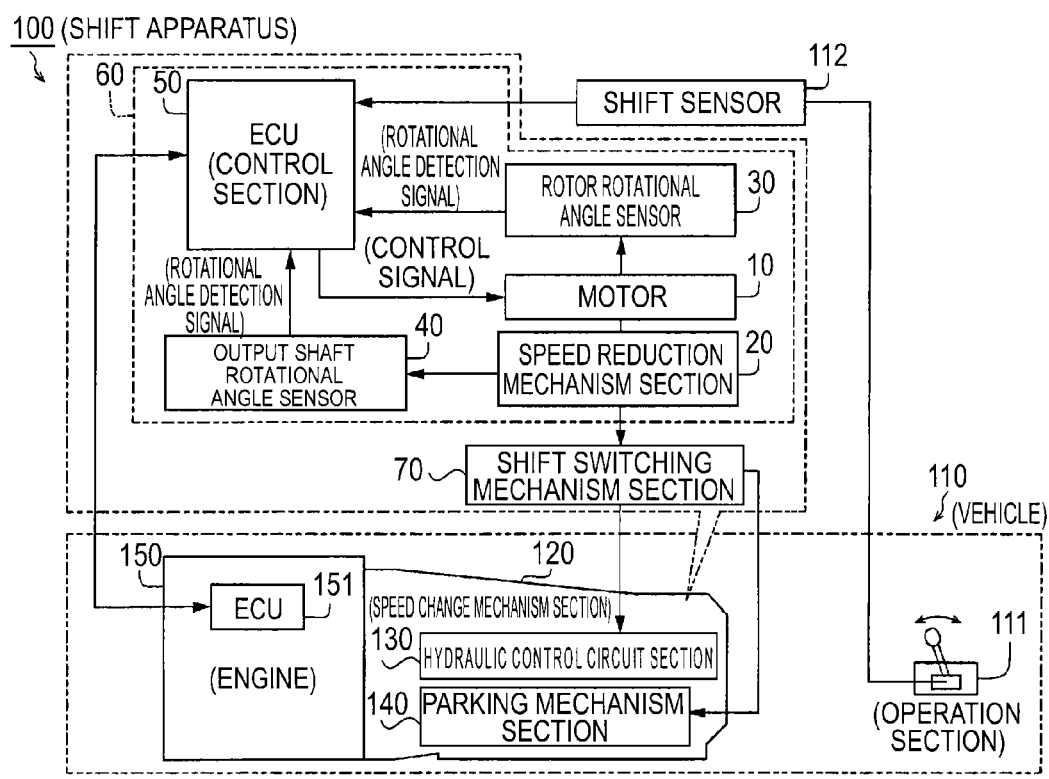
FIG. 1 is a block diagram illustrating a control configuration of a shift apparatus according to one embodiment of this disclosure.

The shift apparatus 100 according to one embodiment of this disclosure is mounted on a vehicle 110 such as an automobile. As illustrated in FIG. 1, in the vehicle 110, if an occupant (driver) performs a switching operation of a shift through an operation section 111 such as a shift lever (or a shift switch), an electrical shift switching control is performed with respect to a speed change mechanism section 120. That is, a position of the shift lever is input on a shift apparatus 100 side through a shift sensor 112 provided in the operation section 111. Then, the speed change mechanism section 120 is switched to a shift position of one of a P (parking) position, an R (reverse) position, an N (neutral) position, and a D (drive) position corresponding to a shift operation performed by the occupant based on a control signal transmitted from a dedicated ECU 50 provided in the shift apparatus 100. Such shift switching control is referred to as shift-by-wire (SBW). Moreover, each of P, R, N, and D positions is one example of the "shift position" of this disclosure.

The shift apparatus 100 includes the actuator unit 60 and a shift switching mechanism section 70 that is driven by the actuator unit 60. Furthermore, the shift switching mechanism section 70 is mechanically connected to a manual spool valve (not illustrated) of a hydraulic valve body in a hydraulic control circuit section 130 within the speed change mechanism section 120 and a parking mechanism section 140. Then, the shift switching mechanism section 70 is driven and thereby shift states (the P position, the R position, the N position, and the D position) of the speed change mechanism section 120 are configured to be mechanically switched.

The actuator unit 60 includes a motor 10, a speed reduction mechanism section 20, a rotor rotational angle sensor 30, an output shaft rotational angle sensor 40, and the ECU 50. Moreover, the ECU 50 is a substrate component in which electronic components are mounted on a substrate 51. Furthermore, these components are accommodated in a box-shaped body section 61 fixed to a case of the speed change mechanism section 120. Furthermore, the actuator unit 60 includes an output shaft 25 connected to an output side of the speed reduction mechanism section 20. Moreover, the motor 10 is one example of an "actuator" and a "three-phase motor" of this disclosure. In addition, the speed reduction mechanism section 20 is one example of a "driving force transmission mechanism" of this disclosure.

Figure 2:
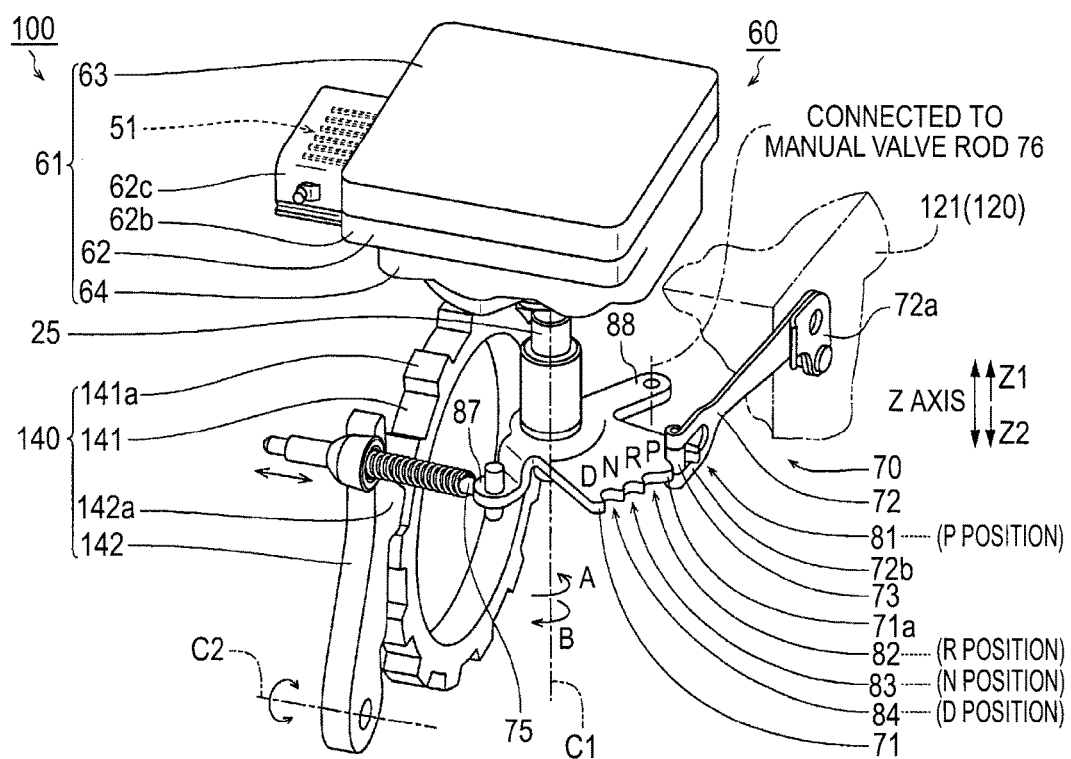
FIG. 2 is a perspective view schematically illustrating an entire configuration of the shift apparatus according to one embodiment of this disclosure.

As illustrated in FIG. 2, the shift switching mechanism section 70 has a detent plate 71 and a detent spring 72. The detent spring 72 is configured to hold the detent plate 71 at a rotational angle position corresponding to each of the P position, the R position, the N position, and the D position. Moreover, the detent plate 71 is one example of a "shift switching member" of this disclosure.

Figure 3:
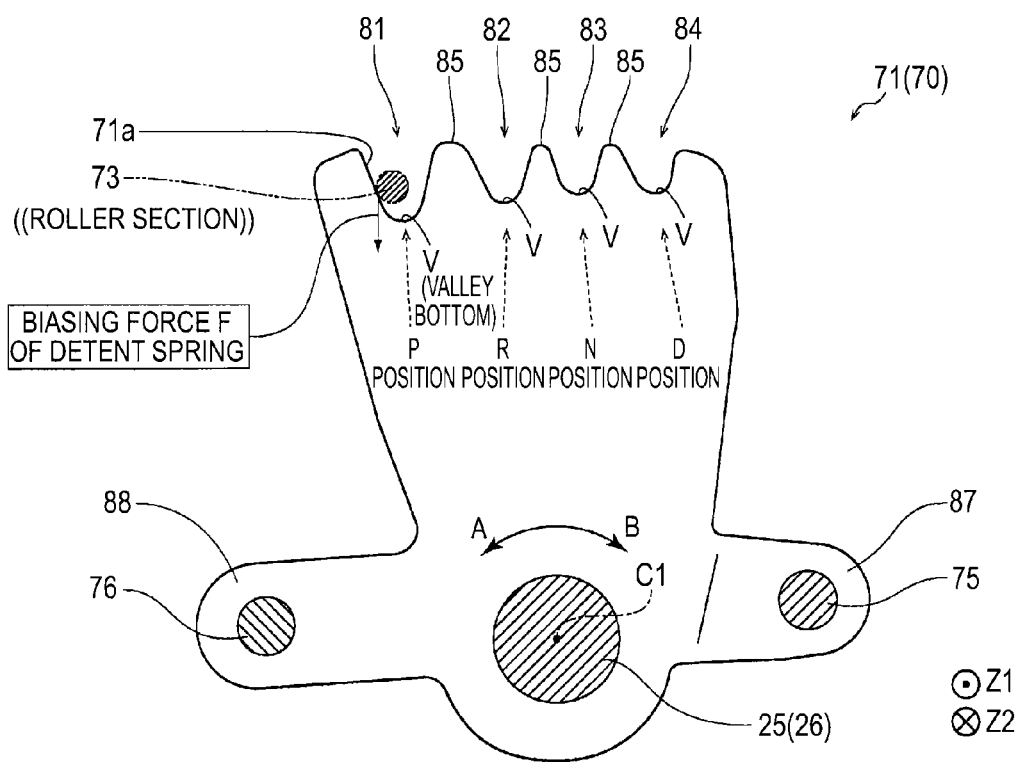
FIG. 3 is a view illustrating a structure of a detent plate configuring the shift apparatus according to one embodiment of this disclosure.

As illustrated in FIG. 3, the detent plate 71 has four valley sections 81 to 84 provided so as to respectively correspond to the P position, the R position, the N position, and the D position. Furthermore, a cam surface 71a having a continuous undulating shape is formed in the detent plate 71 by the valley sections 81 to 84. Furthermore, the valley sections (for example, the valley section 81 and the valley section 82, the valley section 82 and the valley section 83, and the like) adjacent to each other are separated by a mountain section 85 having one top portion. In the detent spring 72, a base end portion 72a is fixed to a casing 121 (see FIG. 2) of the speed change mechanism section 120 and a roller section 73 is mounted on a free end 72b side. Then, the detent spring 72 is configured such that the roller section 73 always presses the cam surface 71a (either one position of the valley sections 81 to 84, or the mountain section 85).

Furthermore, as illustrated in FIG. 2, the detent plate 71 is fixed to a lower end portion (Z2 side) of the output shaft 25 and the detent plate 71 is rotated around a rotation shaft C1 integrally with the output shaft 25. Thus, the detent spring 72 is configured such that the roller section 73 slides along the cam surface 71a with forward or reverse rotation (swing) in arrow A direction or arrow B direction of the detent plate 71, and thereby the roller section 73 is fitted into either one of the valley sections 81 to 84 by a biasing force F of the detent spring 72. Furthermore, the detent spring 72 is configured such that the roller section 73 is selectively fitted into any one of the valley sections 81 to 84 of the detent plate 71, and thereby the detent plate 71 is held in each rotational angle position corresponding to the P position, the R position, the N position, and the D position. Thus, the P position, the R position, the N position, and the D position are individually established.

Furthermore, the detent plate 71 has an arm section 87 and an arm section 88. The arm section 87 is connected to a park rod 75 and the arm section 88 is connected to a manual valve rod 76 (see FIG. 3). Then, if the detent plate 71 is rotated to the rotational angle position corresponding to the R position, the manual spool valve of a leading end portion of the manual valve rod 76 is moved to a position corresponding to the R position within the hydraulic valve body and thereby a hydraulic circuit for the R position is formed within the hydraulic control circuit section 130 (see FIG. 1). For other shift positions, similar to the R position, the manual valve rod 76 (manual spool valve) is moved to a position corresponding to either one shift position with the rotation of the detent plate 71 and thereby a hydraulic circuit corresponding to each shift position is formed within the hydraulic control circuit section 130.

As illustrated in FIG. 2, the parking mechanism section 140 includes a parking gear 141 connected to a crankshaft (not illustrated) of an engine 150 and a lock pawl 142 engaging with the parking gear 141. The lock pawl 142 is moved to a lock position and an unlock position with movement of the park rod 75. If the detent plate 71 is rotated to the rotational angle position corresponding to the P position, the lock pawl 142 is rotated to the lock position around a rotation shaft C2 and then a protruding section 142a engages with a tooth bottom section 141a of the parking gear 141. Thus, free rotation of the parking gear 141 is regulated and rotation of the crankshaft is regulated. In addition, if the detent plate 71 is rotated to the rotational angle position corresponding to a shift state (R, N, and D positions) other than the P position, the lock pawl 142 is rotated to the unlock position and thereby engagement between the lock pawl 142 and the parking gear 141 is released.

Next, a detailed configuration of the actuator unit 60 will be described.

Figure 4:
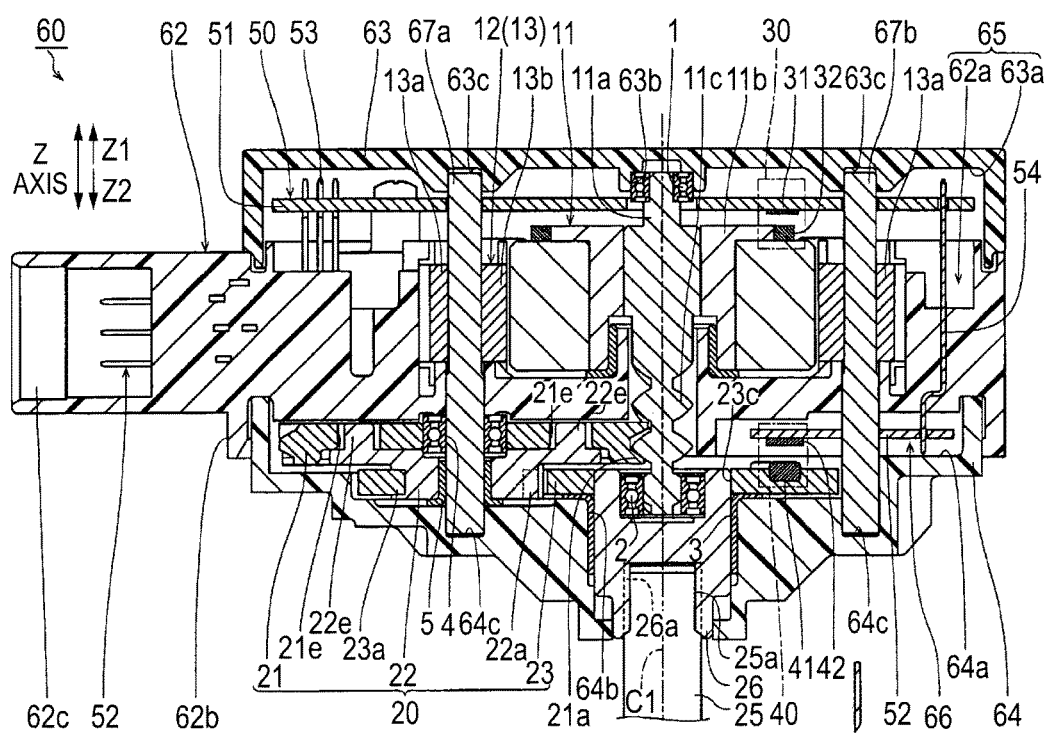
FIG. 4 is a sectional view illustrating an actuator unit configuring the shift apparatus according to one embodiment of this disclosure.

As illustrated in FIG. 4, the body section 61 in the actuator unit 60 is constituted by a motor housing 62, a motor cover 63, and a gear housing 64. The motor housing 62 and the motor cover 63 made of resin having heat resistance are assembled in a state where a concave section 62a and a concave section 63a face each other, and thereby the motor 10 and the ECU 50 are accommodated in a motor chamber 65. Furthermore, the gear housing 64 made of resin faces a concave section 64a and is assembled from a side (Z2 side) opposite to the motor housing 62, and thereby the speed reduction mechanism section 20 is accommodated in a gear chamber 66.

A socket 62c having a terminal 52 is formed on an outside surface 62b on one side of the motor housing 62. Moreover, the terminal 52 is electrically connected to the ECU 50 through wiring 53. Furthermore, power is supplied to the actuator unit 60 through a wiring cable (not illustrated) connected to the socket 62c. Furthermore, mutual communication is performed between the ECU 50 and an ECU 151 (see FIG. 1) controlling the engine 150 through the wiring cable. In addition, the ECU 50 is electrically connected to the motor 10 (see FIG. 1), the rotor rotational angle sensor 30 (see FIG. 1), and the output shaft rotational angle sensor 40 (see FIG. 1).

As illustrated in FIG. 4, the motor 10 is constituted by a rotor 11 that is supported on the motor housing 62 to be rotatable and a stator 12 that is disposed so as to face a periphery of the rotor 11 through a magnetic gap.

Here, in the embodiment, as the motor 10, a three-phase motor of a surface permanent magnet type (SPM) in which a permanent magnet is incorporated in a surface of the rotor 11 is used. Specifically, the rotor 11 has a shaft pinion 11a and a rotor core 11b, and N-pole magnets and S-pole magnets as the permanent magnets are alternately attached to a surface of the rotor core 11b around the rotation shaft C1 at equal angular intervals (45°). Thus, the number of poles of the motor 10 is eight.

In the shaft pinion 11a, an upper end portion (Z1 side) is supported to be rotatable by a bearing member 1 disposed in a rotation shaft support section 63b of the motor cover 63 and a lower end portion (Z2 side) is supported to be rotatable by a bearing member 2 of an output bearing section 26 that is supported to be rotatable by a bearing member 3 pressed into an output shaft support section 64b. Moreover, the bearing member 2 is disposed along the inner periphery of the concave section of the upper end portion (Z1 side) of the output bearing section 26. Thus, the shaft pinion 11a of the rotor 11 and the output shaft 25 are rotated around the same rotation shaft C1. Furthermore, in the shaft pinion 11a, a gear section 11c on which gear grooves are formed in a helical shape, is integrally formed in an outer peripheral region from a center portion to the lower end portion (Z2 side). Moreover, the gear section 11c is a so-called small number of teeth helical gear which has small number of teeth and a large twist angle such that a gear diameter is sufficiently small.

Figure 5:
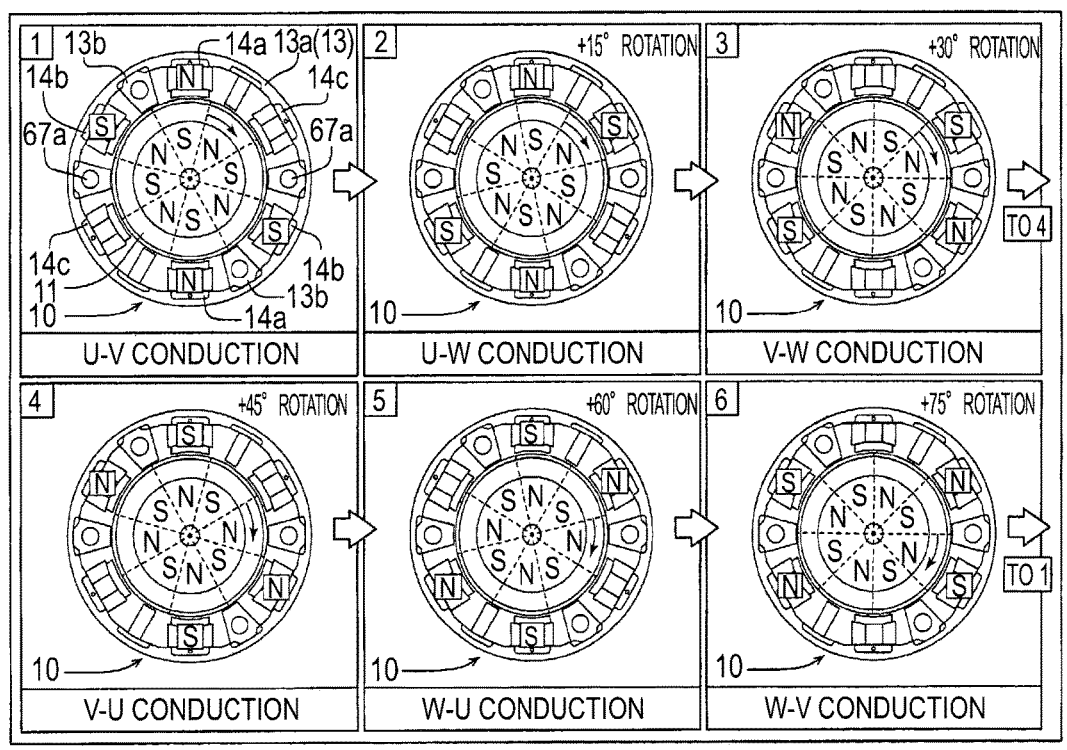
FIG. 5 is a view schematically illustrating a configuration and an operation of a motor within the actuator unit configuring the shift apparatus according to one embodiment of this disclosure.

As illustrated in FIG. 4, the stator 12 has a stator core 13 fixed to an inside of the motor chamber 65 of the motor housing 62 and excitation coils 14a to 14c (see FIG. 5) of a plurality of phases (U phase, V phase, and W phase) generating a magnetic force by conduction. Furthermore, as illustrated in FIG. 5, the excitation coil 14a corresponding to the U phase, the excitation coil 14b corresponding to the V phase, and the excitation coil 14c corresponding to the W phase are disposed in the stator core 13 in this order in the rotating direction (clockwise direction in FIG. 5) of the rotor 11.

As illustrated in FIG. 4, the stator core 13 integrally has a substantially cylindrical body section 13a having the same axial center as the shaft pinion 11a of the rotor 11 and a plurality (four) of teeth 13b protruding from an inner wall surface of the body section 13a to the axial center side. Through holes 13c are respectively formed in a pair of teeth 13b in the teeth 13b disposed on both sides in a radial direction opposite to each other about the axial center in parallel to the shaft pinion 11a. Then, a rod-shaped support shaft 67a and a support shaft 67b inserted into a through hole 62e of the motor housing 62 pass through the through holes 13c. In the support shaft 67a and the support shaft 67b, a rear end portion (upper end portion in FIG. 4) is fitted into a concave section 63c of the motor cover 63, and a front end portion (lower end portion in FIG. 4) is fitted into a concave section 64c of the gear housing 64. Thus, the stator 12 is fixed to an inside of the motor chamber 65. Furthermore, the support shaft 67a, the support shaft 67b, and the shaft pinion 11a are provided such that the axial centers thereof are parallel to each other in a Z direction.

A driving method of the motor 10 will be described. Specifically, as illustrated in FIG. 5, conduction patterns are six of U-V conduction, U-W conduction, V-W conduction, V-U conduction, W-U conduction, and W-V conduction. Here, the U-V conduction means that a current flows from the excitation coil 14a of the U phase to the excitation coil 14b of the V phase, the U phase (excitation coil 14a) is N-pole magnetized and the V phase (excitation coil 14b) is S-pole magnetized. In the U-W conduction, the U phase (the excitation coil 14a) is N-pole magnetized and the W phase (the excitation coil 14c) is S-pole magnetized. In the V-W conduction, the V phase (the excitation coil 14b) is N-pole magnetized and the W phase (the excitation coil 14c) is S-pole magnetized. Similarly, in the V-U conduction, the V phase is N-pole magnetized and the U phase is S-pole magnetized. In the W-U conduction, the W phase is N-pole magnetized and the U phase is S-pole magnetized. In the W-V conduction, the W phase is N-pole magnetized and the V phase is S-pole magnetized. Then, a switching element (not illustrated) is driven and thereby the U-V conduction, the U-W conduction, the V-W conduction, the V-U conduction, the W-U conduction, and the W-V conduction are subsequently repeatedly performed, and the rotor 11 is rotated.

Furthermore, in the motor 10, the rotor 11 is rotated by 15° by giving the U-V conduction once. Similarly, the rotor 11 is rotated by 15° by giving the U-W conduction once. Thus, in each (one conduction step) of the U-V conduction, the U-W conduction, the V-W conduction, the V-U conduction, the W-U conduction, and the W-V conduction, the rotor 11 is rotated by 15° and in six conduction steps, the rotor 11 is rotated by 90°. In addition, in a six conduction step period, an arrangement position (magnetizing phase) of the N-pole and the S-pole in the permanent magnet (not illustrated) within the rotor core 11b is apparently returned to an original. Moreover, one conduction step to the motor 10 increases or decreases a count value corresponding to the rotational angle of the rotor 11 that is detected by the rotor rotational angle sensor 30 (see FIG. 1) described below by "1". Moreover, the one conduction step is one example of a "single driving step" of this disclosure.

Figure 6:
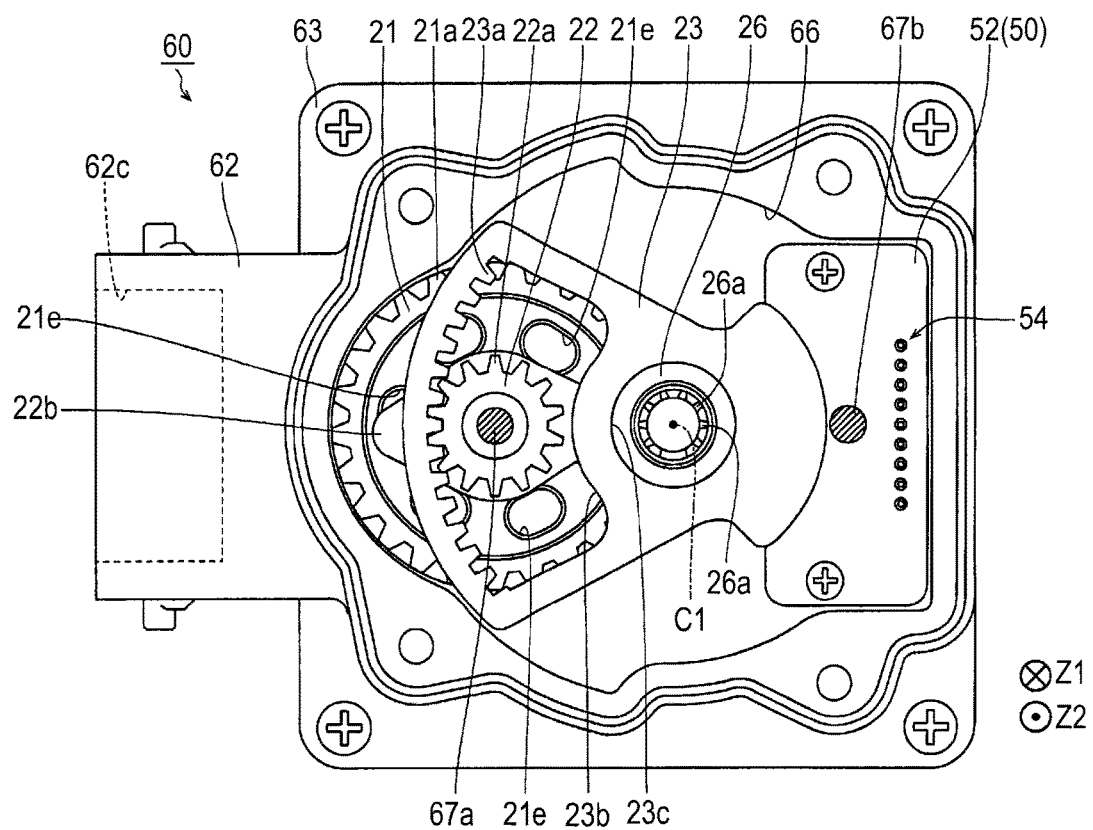
FIG. 6 is a view illustrating an internal structure of a speed reduction mechanism section in a state where a gear housing is removed from a main section in the actuator unit configuring the shift apparatus according to one embodiment of this disclosure.

As illustrated in FIGS. 4 and 6, the speed reduction mechanism section 20 includes the gear section 11c of the rotor 11, an intermediate gear 21 that has a gear section 21a meshing with the gear section 11c, an intermediate gear 22 that is disposed on a lower surface side (Z2 side) in the same axial center as the intermediate gear 21 and engages with the intermediate gear 21, and a final gear 23 that has a gear section 23a meshing with a gear section 22a of the intermediate gear 22. Furthermore, in the shaft pinion 11a, a lower end portion is supported on the bearing member 2 and thereby the gear section 11c crosses the gear chamber 66 vertically (Z direction). Furthermore, the intermediate gear 21 is supported to be rotatable by a bearing member 4 with respect to the support shaft 67a inserted into the through hole 62e of the motor housing 62. Furthermore, the intermediate gear 22 is supported to be rotatable by a substantially cylindrical bearing member 5 fitted into the support shaft 67a. Furthermore, the intermediate gear 21 and the intermediate gear 22 are coaxially stacked. Moreover, the intermediate gear 21 and the intermediate gear 22 are respectively one example of a "driving-side member" and a "driven-side member" of this disclosure.

Figure 7:
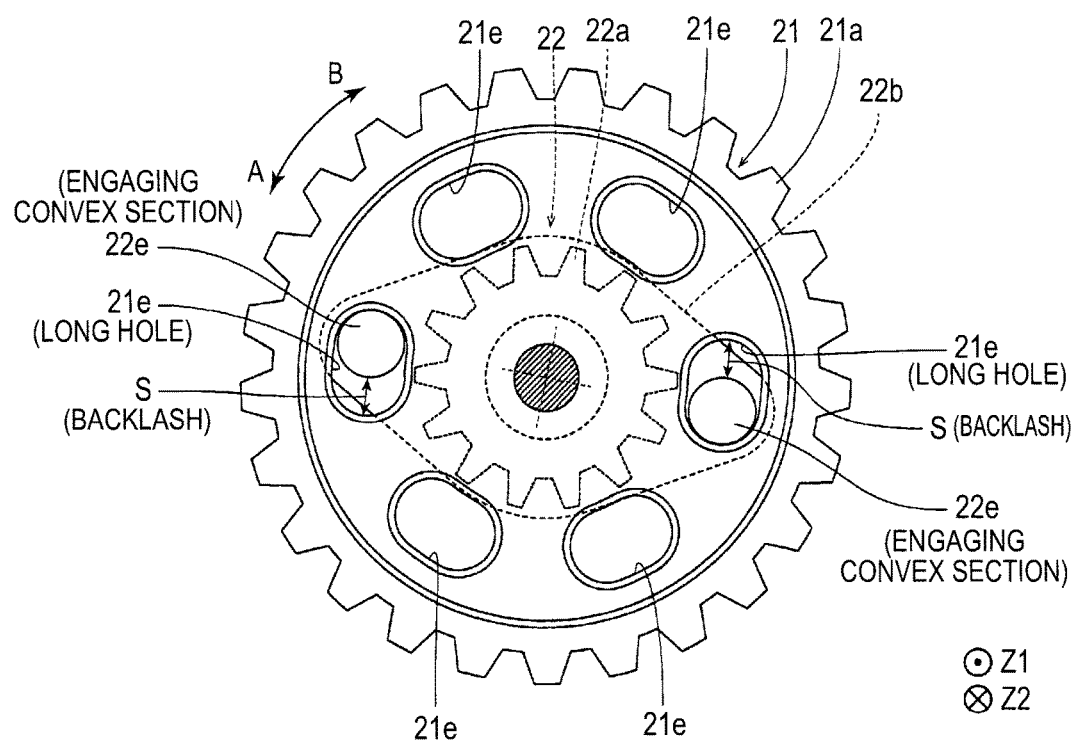
FIG. 7 is a view illustrating a fitting state (state of being able to transmit a driving force) between a first intermediate gear and a second intermediate gear in the actuator unit configuring the shift apparatus according to one embodiment of this disclosure.
Figure 8:
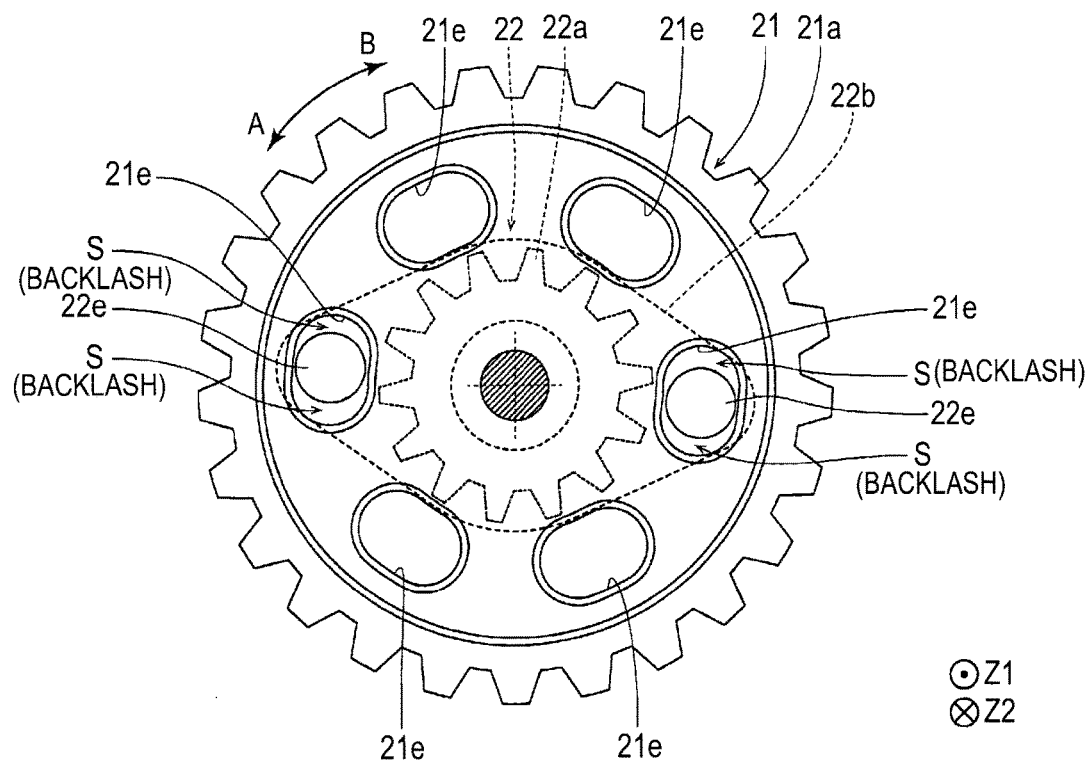
FIG. 8 is a view illustrating an engaged state (state of being unable to transmit the driving force) between the first intermediate gear and the second intermediate gear in the actuator unit configuring the shift apparatus according to one embodiment of this disclosure.

Here, in the embodiment, as illustrated in FIGS. 7 and 8, the intermediate gear 21 is provided with a plurality (six) of long holes 21e, of which long diameters extend in a circumferential direction, between a rotation center portion and an outer periphery portion (gear section 21a). The long holes 21e are arranged at 60° intervals from each other in the circumferential direction. The intermediate gear 22 has an elliptical body section 22b in which the gear section 22a is provided and is provided with a plurality (two) of columnar engaging convex sections 22e protruding upward from an upper surface (Z1 side) of the body section 22b on a side opposite to the gear section 22a. The engaging convex sections 22e are arranged in a peripheral portion on both sides in a long radial direction in the body section 22b. Then, in a state where the intermediate gear 22 is disposed adjacent to the intermediate gear 21 upward (Z1 side) from below, each of the engaging convex sections 22e arranged at 180° intervals is configured so as to be inserted into (engaged with) each of corresponding two long holes 21e of the intermediate gear 21. Moreover, the long hole 21e and the engaging convex section 22e are respectively one example of a "first engagement section" and a "second engagement section" of this disclosure.

Moreover, the engaging convex section 22e is fitted into the long hole 21e of the intermediate gear 21 through a backlash S of a predetermined size (length in the circumferential direction). That is, as illustrated in FIG. 8, the intermediate gear 21 and the intermediate gear 22 are configured so as to allow relatively free rotation (free rotation) therebetween by the backlash S (predetermined angle width) in the circumferential direction generated in the engaging convex section 22e and the long hole 21e that are fitted into each other. Thus, the intermediate gear 21 and the intermediate gear 22 are not always integrally rotated, the intermediate gear 21 is configured such that rotation transmitted to the intermediate gear 21 is transmitted to the intermediate gear 22 by allowing the relatively free rotation (free rotation) in one direction (arrow A direction) or the other direction (arrow B direction) at a predetermined angle width. In addition, FIG. 7 illustrates a state where a driving force can be transmitted from the intermediate gear 21 to the intermediate gear 22 and FIG. 8 illustrates a state where the driving force cannot be transmitted from the intermediate gear 21 to the intermediate gear 22.

In addition, as illustrated in FIG. 6, the gear section 22a of the intermediate gear 22 meshes with the gear section 23a of the fan-shaped final gear 23 that is incorporated so as to be integrally rotated with the output bearing section 26 in a state of having the same rotation shaft C1 as the output bearing section 26. The gear section 23a is formed as an internal gear on an inside of a substantially circular arc-shaped insertion hole 23b provided in the final gear 23 along an outer peripheral edge. The gear section 23a is formed of a gear having a diameter larger than that of the gear section 22a. In addition, in the final gear 23, the output bearing section 26 is fixed to a fitting hole 23c having a rotation center at a position of a fan-shaped "pivot (keystone)". The speed reduction mechanism section 20 is configured such that a speed of rotation of the shaft pinion 11a is reduced on the output shaft 25 side by the intermediate gear 21, the intermediate gear 22, and the final gear 23.

Moreover, the speed reduction mechanism section 20 is configured such that a speed reduction ratio is 1:50. That is, if the rotor 11 is rotated 50 (the motor 10 is a conduction step of 24×50=1200), the output shaft 25 is configured to be rotated 1. Thus, in the motor 10, since the rotor 11 is rotated 15° in the one conduction step, the output shaft 25 is rotated 0.3° (=15/50).

In addition, a plurality of longitudinal groove sections (serrations) 26a, extending in the axial direction, are formed in an inner periphery of a concave section of a lower end portion (Z2 side) of the output bearing section 26. Furthermore, a plurality of longitudinal groove sections (serrations) 25a, extending in the axial direction, are formed in an outer periphery of an upper end portion (Z1 side) of the output shaft 25 (see FIG. 4). Thus, the longitudinal groove section 25a of the output shaft 25 is configured to be fitted into and connected to the longitudinal groove sections 26a of the output bearing section 26 at an appropriate rotational angle position to transmit a torque. Thus, the output shaft 25 in which the detent plate 71 is fixed to the lower end portion (Z2 side) is assembled to the actuator unit 60 at an appropriate rotational angle position.

The rotor rotational angle sensor 30 is a digital encoder that outputs the number of pulses corresponding to a rotation amount (rotational angle) of the rotor 11. That is, as illustrated in FIG. 4, the rotor rotational angle sensor 30 (within a frame formed by one-dotted chain line) is constituted by a magnetic sensor 31 formed of a Hall IC and a detection magnet 32. The magnetic sensor 31 is mounted on the substrate 51 and the magnet 32 is attached to an upper surface (Z1 side) of the rotor core 11b. Then, a rotational angle (rotational position) of the rotor 11 is detected by the magnetic sensor 31 provided in the substrate 51 so as to face the magnet 32. In addition, switching of conduction to the excitation coils 14a to 14c (see FIG. 5) is controlled by detecting the rotational angle of the rotor 11 by the rotor rotational angle sensor 30, and thereby the rotation of the motor 10 is appropriately controlled. The rotor rotational angle sensor 30 is an incremental type for detecting the rotation amount (the rotational angle) and the rotational angle of the rotor 11 by adding the number of pulses.

The output shaft rotational angle sensor 40 is an analog magnetic sensor that detects a magnetic force corresponding to an output angle of the output shaft 25 and outputs an analog signal corresponding to a detected magnetic force. That is, as illustrated in FIG. 4, the output shaft rotational angle sensor 40 (within a frame formed by one-dotted chain line) is constituted by a magnetic sensor 41 formed of the Hall IC and a detection magnet 42. The magnetic sensor 41 is mounted on a substrate 52 and the magnet 42 is attached to an end portion of the final gear 23 on a fan-shaped pattern side. Moreover, the substrate 52 and the substrate 51 are electrically connected by wiring 54. Then, the rotational angle (rotational position of the output shaft 25) of the final gear 23 is configured to be detected by the magnetic sensor 41 provided in the substrate 52 so as to face the magnet 42. Moreover, the rotational position (output angle) of the output shaft 25 is detected as a continuous voltage value.

In the embodiment, the actuator unit 60 is configured to have the following function by the configuration described above.

Specifically, the intermediate gear 21 and the intermediate gear 22 are configured to be relatively rotatable by the backlash S by providing a predetermined amount of backlash S (see FIG. 7) between the intermediate gear 21 and the intermediate gear 22 in a state of being fitted. Then, a position (see FIG. 3) of each valley bottom V of the valley sections 81 to 84, into which the roller section 73 of the detent spring 72 is fitted, is configured to be learned, based on a difference between a rotational angle on the motor 10 side, which is generated due to the predetermined amount of backlash S, and a rotational angle on the detent plate 71 side. In addition, a learning result of the position of each valley bottom V of the P position, the R position, the N position, and the D position is configured to be reflected, and set to rotation control of the actuator unit 60.

More particularly, when the roller section 73 of the detent spring 72 goes from the upper portion (inclined portion) of either one of the valley sections 81 to 84 to the valley bottom V, the detent plate 71 and the intermediate gear 22 are swung by a force (biasing force F of the detent spring 72 indicated in FIG. 3) operating to drop the detent spring 72 into the valley bottom V of either one of the valley sections 81 to 84, and thereby the intermediate gear 22 is configured so as to be swung (rotated) by the predetermined amount of backlash S prior to the rotation of the intermediate gear 21. Then, the position of each valley bottom V of the valley sections 81 to 84 is configured to be learned, based on a difference between the rotational angle (rotational angle change) on the detent plate 71 side in a state where the detent spring 72 drops into the valley bottom V of either one of the valley sections 81 to 84 and swing of the detent plate 71 is stopped, and the rotational angle (rotational angle change) on the motor 10 side when the intermediate gear 21 is follow-up rotated by the predetermined amount of backlash S. Moreover, the biasing force F is one example of a "force operating to drop the positioning member into the valley bottom of the valley section" of this disclosure.

In this case, the positions of the valley bottoms V of the valley sections 81 to 84 are configured to be learned, based on the difference between the rotational angle (rotational angle change) of the rotor 11 detected by the rotor rotational angle sensor 30 which is generated due to the predetermined amount of backlash S and the rotational angle (rotational angle change) of the detent plate 71 (the final gear 23) that is detected by the output shaft rotational angle sensor 40.

Figure 9:
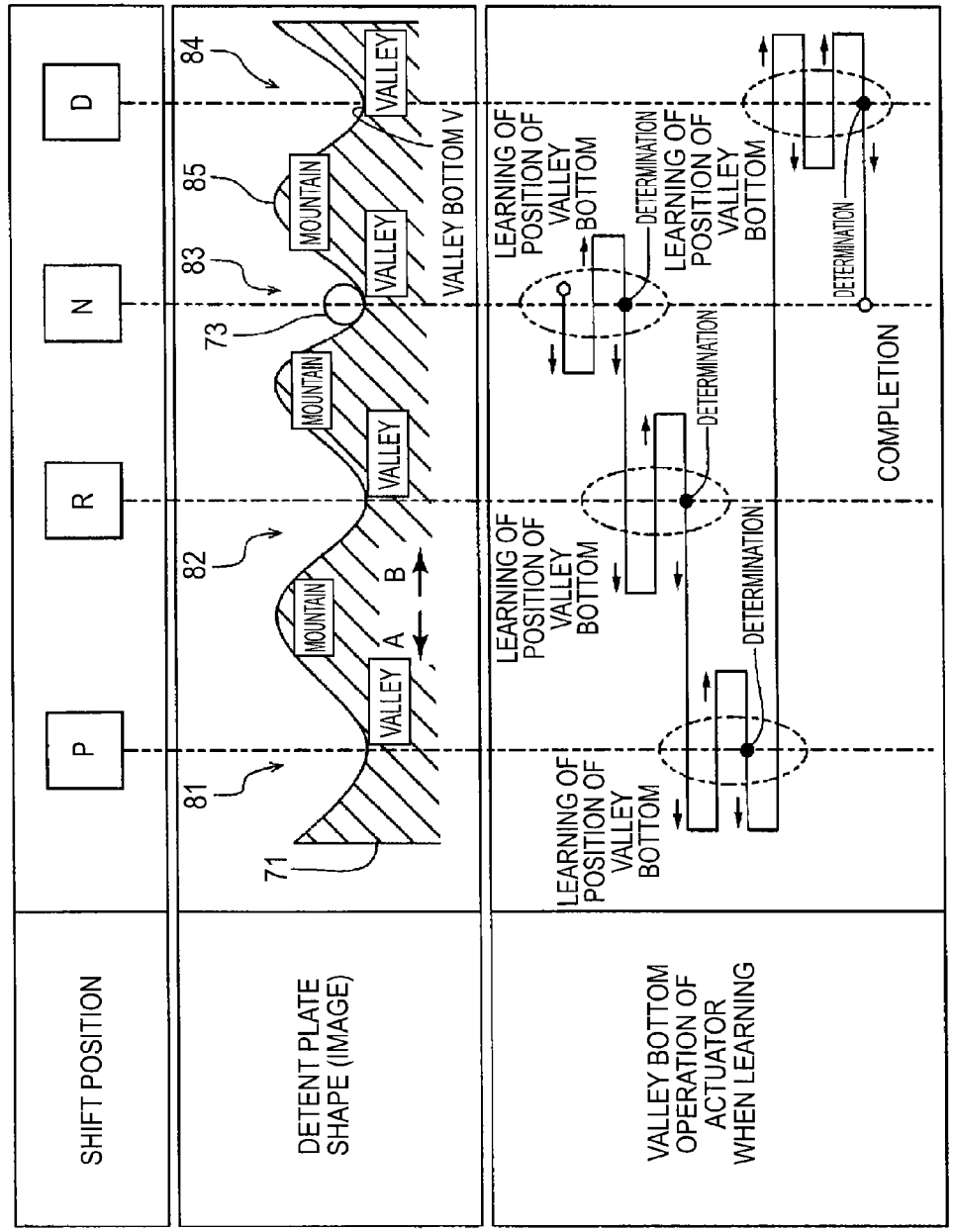
FIG. 9 is a view schematically illustrating an aspect in which learning of a position of a valley bottom of a valley section of the detent plate is performed in the shift apparatus according to one embodiment of this disclosure.

In addition, in the embodiment, in each shift position of the P position, the R position, the N position, and the D position, the position of the valley bottom V of the corresponding valley section 81 (82 to 84) is configured to be learned and to be set to the rotation control of the actuator unit 60. Particularly, as illustrated in FIG. 9, after the position of the valley bottom V of the valley section 83 corresponding to the N position is learned, all positions of the valley bottoms V are configured to be sequentially learned in order of the position of the valley bottom V of the valley section 82 corresponding to the R position, the position of the valley bottom V of the valley section 81 corresponding to the P position, and the position of the valley bottom V of the valley section 84 corresponding to the D position. Then, these are configured to be set to a control setting value of the shift apparatus 100 (ECU 50). Moreover, timing of learning of the position of the valley bottom V of the vehicle 110 is preferably at the time of being shipped from a plant and at which the shift apparatus 100 is incorporated. In addition, the learning may be performed by a service plant during after-service of the vehicle 110 and the like.

Next, a learning method of the position of the valley bottom V of the valley section 81 (82 to 84), into which the roller section 73 of the detent spring 72 is fitted, will be described in detail with reference to FIGS. 1 to 3 and 7 to 11. Hereinafter, as one example, a case where the roller section 73 of the detent spring 72 (see FIG. 2) learns (grasps) an accurate position of the valley bottom V of the valley section 84 (see FIG. 3) corresponding to the D position in the detent plate 71 on the ECU 50 (see FIG. 1) side will be described. Moreover, the accurate position of the valley bottom V means that the count value on control of the motor 10 is determined and is grasped on the ECU 50 side when the roller section 73 is accurately positioned in the valley bottom V. Moreover, in FIGS. 10 and 11, only two long holes 21e with which the engaging convex sections 22e are engaged are illustrated in the intermediate gear 21 and others are appropriately omitted.

First, as illustrated in FIG. 9, the roller section 73 is present in the valley section 83 corresponding to the N position (shift position). Then, an operation of learning the accurate position of the valley bottom V of the valley section 84 corresponding to the D position is performed on the ECU 50 (see FIG. 1) side at predetermined timing.

In this case, first, as illustrated in FIG. 10, the motor 10 (see FIG. 1) is driven and thereby the detent plate 71 is rotated in the arrow A direction through the speed reduction mechanism section 20 (see FIG. 1). In this case, one end portion of the long hole 21e of the intermediate gear 21 is fitted into the engaging convex section 22e of the intermediate gear 22 to transmit the driving force to the engaging convex section 22e and thereby the driving force of the motor 10 is transmitted to the output shaft 25 (see FIG. 2) through the gear section 11c, the intermediate gear 21, the intermediate gear 22, and the final gear 23 (see FIG. 4). Thus, the roller section 73 moves to ride the inclined surface of the valley section 83 (N position) on the valley section 84 (D position) side to the mountain section 85 together with the rotation of the detent plate 71 in the arrow A direction. In this case, for example, the count value corresponding to the rotational angle of the rotor 11 detected by the rotor rotational angle sensor 30 (see FIG. 1) is reduced by one count such as "21", "20", "19", "18", and "17". Thus, a voltage level corresponding to the rotational angle of the output shaft 25 detected by the output shaft rotational angle sensor 40 (see FIG. 1) is reduced at a constant rate. In addition, in this state, the engaged state of the intermediate gear 21 and the intermediate gear 22 corresponds to the state of FIG. 7.

Then, after the roller section 73 climbs over the mountain section 85 of a border between the valley section 83 (N position) and the valley section 84 (D position), the detent plate 71 is naturally rotated in the arrow A direction prior to the motor 10 (intermediate gear 21). That is, since the detent plate 71 is always biased to the valley section 84 by the roller section 73, the detent plate 71 is rotated in the arrow A direction by the biasing force F (see FIG. 3) prior to the motor 10 within a range of a size of the backlash S of the long hole 21e. Then, the roller section 73 drops into the valley bottom V of the valley section 84. In this case, the count value corresponding to the rotational angle of the rotor 11 decreases in the same increment (one count) as "16" and "15", and the voltage level corresponding to the rotational angle of the output shaft 25 sharply decreases together with dropping (suction) of the roller section 73 into the valley bottom V. Furthermore, this state is grasped on the ECU 50 side.

Then, in a state where the roller section 73 is completely fitted into the valley bottom V of the valley section 84, even if the intermediate gear 21 is rotated together with the rotation of the rotor 11, since the engaging convex section 22e is engaged with the inside of the long hole 21e not to transmit the driving force by using the backlash S, the intermediate gear 22 is not rotated. That is, the long hole 21e is relatively rotated only in one direction (arrow A direction) with respect to the engaging convex section 22e that is stopped in the valley bottom V. Furthermore, in this state, the engaged state of the intermediate gears 21 and 22 corresponds to the state of FIG. 8. In this case, the count value corresponding to the rotational angle of the rotor 11 decreases in the same increment (one count) as "15", "14", "13", . . . , and "5", and the voltage level corresponding to the rotational angle of the output shaft 25 is maintained at a constant value (flatness) because dropping (suction) of the roller section 73 into the valley bottom V is maintained. Furthermore, a state (state where the voltage level by the output shaft rotational angle sensor 40 becomes flat and does not substantially changed) where the rotational angle on the detent plate 71 side is not changed with respect to the change (change of the count value from "5" to "15" by the rotor rotational angle sensor 30) in the rotational angle on the motor 10 side is grasped on the ECU 50 side. In addition, this state is recognized as a "first time".

Then, the long hole 21e is rotated by 10 counts in the arrow A direction and thereby one end portion of the long hole 21e catches up with the engaging convex sections 22e of the intermediate gear 22 and then the engaging convex sections 22e engage with the long hole 21e to transmit the driving force again. In this state, the engaged state of the intermediate gears 21 and 22 corresponds to the state of FIG. 7. Then, the roller section 73 starts to climb over the inclined surface of the valley section 84 (D position) on a side (B side) opposite to the valley section 83 (N position) together with the rotation of the detent plate 71 in the arrow A direction by the driving of the motor 10. In this case, the count value corresponding to the rotational angle of the rotor 11 decreases to "4", "3", and "2". Furthermore, the voltage level corresponding to the rotational angle of the output shaft 25 decreases at a constant rate.

When this state is grasped on the ECU 50 side, the rotating direction of the motor 10 is reversed. In addition, immediately after the motor 10 is rotated in the reverse direction, the detent plate 71 is naturally rotated in the arrow B direction prior to the motor 10 (intermediate gear 21). That is, since the detent plate 71 is always biased to the valley section 84 by the roller section 73, the detent plate 71 is rotated in the arrow B direction by the biasing force F prior to the motor 10 within the range of the size of the backlash S of the long hole 21e. Then, the roller section 73 drops into the valley bottom V of the valley section 84 again. In this case, the count value corresponding to the rotational angle of the rotor 11 increases by one count as "3" and "4". Thus, the voltage level corresponding to the rotational angle of the output shaft 25 also increases at a constant rate. In addition, this state is grasped on the ECU 50 side.

Then, in a state where the roller section 73 is completely fitted into the valley bottom V of the valley section 84, despite that the intermediate gear 21 is rotated together with the rotation of the rotor 11, since the engaging convex sections 22e are engaged with the inside of the long hole 21e so as not to transmit the driving force by using the backlash S, the intermediate gear 22 is not rotated. That is, the long hole 21e is relatively rotated with respect to the engaging convex sections 22e that are stopped in the valley bottom V only in the other direction (arrow B direction). Furthermore, in this state, the engaged state of the intermediate gears 21 and 22 corresponds to the state of FIG. 8. In this case, the count value corresponding to the rotational angle of the rotor 11 increases in the same increment (one count) in the order of "5", "6", "7", . . . , and "15", and the voltage level corresponding to the rotational angle of the output shaft 25 maintains a constant value (flatness) because dropping (suction) of the roller section 73 is maintained in the valley bottom V. Furthermore, a state (state where the voltage level by the output shaft rotational angle sensor 40 becomes flat and is not substantially changed) where the rotational angle on the detent plate 71 side is not changed with respect to the change (change of the count value by the rotor rotational angle sensor 30 from "5" to "15") in the rotational angle on the motor 10 side is grasped on the ECU 50 side. In addition, this state is recognized as a "second time".

Then, as illustrated in FIG. 11, the long hole 21e is rotated by 10 counts in the arrow B direction and thereby the other end portion of the long hole 21e catches up with the engaging convex sections 22e of the intermediate gear 22 and then the engaging convex sections 22e engage with the long hole 21e to transmit the driving force again. In this state, the engaged state of the intermediate gears 21 and 22 corresponds to the state of FIG. 7. Then, the roller section 73 starts to climb over the inclined surface of the valley section 84 (D position) on a side (A side) opposite to the valley section 83 (N position) together with the rotation of the detent plate 71 in the arrow B direction by the driving of the motor 10. In this case, the count value corresponding to the rotational angle of the rotor 11 increases in the order of "16", "17", and "18". Furthermore, the voltage level corresponding to the rotational angle of the output shaft 25 gradually increases.

When this state is grasped on the ECU 50 side, the rotating direction of the motor 10 is reversed again. In addition, immediately after the motor 10 is rotated in the reverse direction, the detent plate 71 is naturally rotated in the arrow A direction prior to the motor 10 (intermediate gear 21). That is, since the detent plate 71 is always biased to the valley section 84 by the roller section 73, the detent plate 71 is rotated in the arrow A direction by the biasing force F (see FIG. 3) prior to the motor 10 within the range of the size of the backlash S of the long hole 21e. Then, the roller section 73 drops into the valley bottom V of the valley section 84 again. In this case, the count value corresponding to the rotational angle of the rotor 11 decreases by one count as "17" to "16". Thus, the voltage level corresponding to the rotational angle of the output shaft 25 also gradually decreases. In addition, this state is grasped on the ECU 50 side.

Then, in a state where the roller section 73 is completely fitted into the valley bottom V of the valley section 84, despite that the intermediate gear 21 is rotated together with the rotation of the rotor 11, since the engaging convex sections 22e are engaged with the inside of the long hole 21e not to transmit the driving force by using the backlash S, the intermediate gear 22 is not rotated. That is, the long hole 21e is relatively rotated with respect to the engaging convex sections 22e that are stopped only in one direction (arrow A direction). Furthermore, in this state, the engaged state of the intermediate gears 21 and 22 corresponds to the state of FIG. 8. In this case, the count value corresponding to the rotational angle of the rotor 11 decreases in the same increment (one count) in the order of "15", "14", "13", . . . , and "5", and the voltage level corresponding to the rotational angle of the output shaft 25 maintains a constant value (flatness) because dropping (suction) of the roller section 73 is maintained in the valley bottom V. Furthermore, a state (state where the voltage level by the output shaft rotational angle sensor 40 becomes flat and is not substantially changed) where the rotational angle on the detent plate 71 side is not changed with respect to the change (change of the count value by the rotor rotational angle sensor 30 from "5" to "15") in the rotational angle on the motor 10 side is grasped on the ECU 50 side. In addition, this state is recognized as a "third time".

Then, the long hole 21e is rotated by 10 counts in the arrow A direction and thereby one end portion of the long hole 21e catches up with the engaging convex sections 22e of the intermediate gear 22 and then the engaging convex sections 22e engage with the long hole 21e to transmit the driving force again. In this state, the engaged state of the intermediate gears 21 and 22 corresponds to the state of FIG. 7. Then, the roller section 73 starts to climb over the inclined surface of the valley section 84 (D position) on the side (B side) opposite to the valley section 83 (N position) together with the rotation of the detent plate 71 in the arrow A direction by the driving of the motor 10. In this case, the count value corresponding to the rotational angle of the rotor 11 decreases in the order of "4", "3", and "2". Furthermore, the voltage level corresponding to the rotational angle of the output shaft 25 gradually decreases.

When this state is grasped on the ECU 50 side, the rotating direction of the motor 10 is reversed again. In addition, immediately after the motor 10 is rotated in the reverse direction, the detent plate 71 is naturally rotated in the arrow B direction prior to the motor 10 (intermediate gear 21). That is, since the detent plate 71 is always biased to the valley section 84 by the roller section 73, the detent plate 71 is rotated in the arrow B direction by the biasing force F prior to the motor 10 within the range of the size of the backlash S of the long hole 21e. Then, the roller section 73 drops into the valley bottom V of the valley section 84 again. In this case, the count value corresponding to the rotational angle of the rotor 11 increases by one count as "3" to "4". Thus, the voltage level corresponding to the rotational angle of the output shaft 25 also gradually increases. In addition, this state is grasped on the ECU 50 side.

Then, in a state where the roller section 73 is completely fitted into the valley bottom V of the valley section 84, despite that the intermediate gear 21 is rotated together with the rotation of the rotor 11, since the engaging convex sections 22e are engaged with the inside of the long hole 21e not to transmit the driving force by using the backlash S, the intermediate gear 22 is not rotated. That is, the long hole 21e is relatively rotated with respect to the engaging convex sections 22e that are stopped only in the other direction (arrow B direction). Furthermore, in this state, the engaged state of the intermediate gears 21 and 22 corresponds to the state of FIG. 8. In this case, the count value corresponding to the rotational angle of the rotor 11 increases in the same increment (one count) in the order of "5", "6", "7", . . . , and "15", and the voltage level corresponding to the rotational angle of the output shaft 25 maintains a constant value (flatness) because dropping (suction) of the roller section 73 is maintained in the valley bottom V. Furthermore, a state (state where the voltage level by the output shaft rotational angle sensor 40 becomes flat and is not substantially changed) where the rotational angle on the detent plate 71 side is not changed with respect to the change (change of the count value by the rotor rotational angle sensor 30 from "5" to "15") in the rotational angle on the motor 10 side is grasped on the ECU 50 side. In addition, this state is recognized as a "fourth time".

Thus, in the embodiment, it is determined that the count value by the rotor rotational angle sensor 30 of a segment in which the roller section 73 is in a state of being completely fitted into the valley bottom V of the valley section 84 and the intermediate gear 21 does not substantially rotate the intermediate gear 22 is a range of "5" to "15" referring to the recognized results of the "second time", the "third time", and the "fourth time" but not the "first time". Then, the rotational position of the rotor 11 corresponding to "10" that is an intermediate count value of "5" to "15" indicates that the detent plate 71 is in a state of being accurately positioned in the valley bottom V of the D position.

In the example, the intermediate gear 21 is rotated four times (reciprocation of 2 times) in the forward and reverse directions (the arrow A direction and the arrow B direction) by using a predetermined amount of backlash S provided between the intermediate gear 21 and the intermediate gear 22. Then, the position of the valley bottom V of the valley section 84 corresponding to the D position is learned, based on a measurement result of a difference between the rotational angles (rotational angle changes) on the motor 10 side in each rotating direction in the "second time", the "third time", and the "fourth time" but not the "first time", and the rotational angle (rotational angle change) on the detent plate 71 side.

Moreover, for the valley section 81 corresponding to the P position, the valley section 82 corresponding to the R position, and the valley section 83 corresponding to the N position, each position of the valley bottom V is learned by a method similar to the learning method of the valley bottom V of the valley section 84 corresponding to the D position described above. In FIG. 9, when learning the N position, the R position, and the P position, the intermediate gear 22 is half-swung by reciprocation of one time respectively and each positions of the valley bottoms V of the valley sections 83, 82, and 81 corresponding to each shift position is learned based on a measurement result of a difference between the rotational angles on the motor 10 of the "second time" and the "third time" but not the "first time", and the rotational angle on the detent plate 71 side.

Furthermore, as the rotor rotational angle sensor 30, a sensor of a magnetic field angle detection type is used. Thus, it has a characteristic that a degree of influence of a leakage magnetic flux of the motor 10 is changed depending on a magnetic field angle of the magnet 42 attached to the end portion of the final gear 23 on the fan-shaped pattern side. However, the positions of the magnetic sensor 31 and the magnet 32 are the same as each other at 6 conduction step periods.

Thus, in the embodiment, a lower limit value of the predetermined amount of backlash S is set to be equal to or greater than the rotational angle on the motor 10 side corresponding to the 6 conduction steps (1.8° (=0.3×6) or more at a reference of the rotational angle of the final gear 23). Thus, it is possible to ignore the degree of influence of the leakage magnetic flux and it is devised so as to remove disturbance of a voltage value due to the leakage magnetic flux of the motor by comparing a voltage value (voltage level corresponding to the rotational angle of the output shaft 25 detected by the output shaft rotational angle sensor 40) corresponding to a current count value and a voltage value (voltage level corresponding to the rotational angle of the output shaft 25 detected by the output shaft rotational angle sensor 40) corresponding to a count value before the 6 conduction steps from the current count value.

Furthermore, it is preferable that the comparison of the current and before the 6 conduction steps is compared to each of continuous 3 conduction steps (3 counts). For example, in a second learning process of FIG. 10, the voltage level corresponding to the count value of "10" is compared to the voltage level corresponding to the count value "5" before 6 counts from "10". Furthermore, the voltage level corresponding to the count value "11" is compared to the voltage level corresponding to the count value "6" before 6 counts from "11". Furthermore, the voltage level corresponding to the count value "12" is compared to the voltage level corresponding to the count value "7" before 6 counts from "12". Then, furthermore, determination is performed on whether or not flatness is present in the voltage level of the output shaft rotational angle sensor 40 even if one count advances by allowing a margin. Thus, it is preferable that the size (rotational angle) of the backlash S is an angle or more corresponding to the number of counts of 10 counts (=6+3+1) or more (3° (=0.3×10) or more in a rotational angle reference of the final gear 23) in terms of the count value. Thus, even if noise is generated due to the leakage magnetic flux when driving the motor 10, the rotational angles on the detent plate 71 side are compared to each other in a state of being the same phase for every 6 conduction steps, and thereby it is possible to accurately grasp the change (the voltage level corresponding to the rotational angle of the output shaft 25 detected by the output shaft rotational angle sensor 40) of the rotational angle on the detent plate 71 side regardless of presence or not of the generation of noise.

Furthermore, it is inconvenient even if the size (range of an angle in which the intermediate gear 22 can be freely rotated with respect to the intermediate gear 21: long radial diameter of the long hole 21e) of the backlash S is too large. That is, in the embodiment, an upper limit value of the predetermined amount of backlash S is set to be equal to or less than the rotational angle on the detent plate 71 side corresponding to the valley section having a minimum rotation distance from the valley bottom V of the valley section in the valley sections 81 to 84 to the top portion of the mountain section 85 separating the valley sections adjacent to each other.

That is, in FIG. 3, the upper limit value of the predetermined amount of backlash S is to be less than the rotational angle (the rotational angle of the final gear 23 or the output shaft 25) on the detent plate 71 side corresponding to a minimum value of the rotation distance from one valley section to the top portion of the mountain section 85 separating the valley sections adjacent to each other, such as the rotation distance (rotational angle of the final gear 23 or the output shaft 25) of the detent plate 71 from the valley bottom V of the valley section 81 to the top portion of the mountain section 85 on the valley section 82 side, the rotation distance (rotational angle of the final gear 23 or the output shaft 25) of the detent plate 71 from the valley bottom V of the valley section 82 to the top portion of the mountain section 85 on the valley section 81 side, the rotation distance (rotational angle of the final gear 23 or the output shaft 25) of the detent plate 71 from the valley bottom V of the valley section 82 to the top portion of the mountain section 85 on the valley section 83 side, and the rotation distance (rotational angle of the final gear 23 or the output shaft 25) of the detent plate 71 from the valley bottom V of the valley section 83 to the top portion of the mountain section 85 on the valley section 82 side. Thus, for example, the roller section 73 of the detent spring 72 is prevented from erroneously moving to adjacent valley section 84 or valley section 82 by forward or reverse rotation of the intermediate gear 22 exceeding the valley section 83 that is a learning target due to the backlash S having an excessive size. As described above, appropriate lower limit value and upper limit value are set in the size (range of the angle in which the intermediate gear 22 can be freely rotated with respect to the intermediate gear 21: long radial diameter of the long hole 21e) of the backlash S. In the embodiment, the shift apparatus 100 is configured as described above.

In the embodiment, it is possible to obtain the following effects.

In the embodiment, as described above, the intermediate gear 21 and the intermediate gear 22 are configured to be relatively rotatable in the engaged state by the predetermined amount of backlash S by providing the predetermined amount of backlash S between the intermediate gear 21 and the intermediate gear 22. Then, the ECU 50 is configured so as to learn the position of the valley bottom V of the valley section 81 (82 to 84) into which the roller section 73 of the detent spring 72 is fitted, based on the difference between the rotational angle (rotational angle change) on the motor 10 side which is generated due to the predetermined amount of backlash S and the rotational angle (rotational angle change) on the detent plate 71 side. Thus, it is possible to move the roller section 73 to the valley bottom V of the valley section 81 (82 to 84) by rotating (swinging) the intermediate gear 22 by the predetermined amount of backlash S (play) that is intentionally provided between the intermediate gear 21 and the intermediate gear 22 by using the biasing force F by which the roller section 73 of the detent spring 72 is depressed against the detent plate 71 in the direction of fitting into the valley section 81 (82 to 84). Thus, it is possible to learn the position of the valley bottom V of the valley section 81 (82 to 84) into which the roller section 73 is fitted without applying an undue load (external force) on the motor 10 side or the detent spring 72 side. Furthermore, it is possible to individually grasp the position of the valley bottom V of the valley section 81 (82 to 84) by learning the position of the valley bottom V of the valley section 81 (82 to 84) into which the roller section 73 is actually fitted in the shift apparatus 100 having individual differences such as manufacturing errors. As a result, it is possible to suppress that positioning accuracy of the shift position is lowered while suppressing that durability of the motor 10, the detent plate 71, and the roller section 73 is lowered.

Furthermore, in the embodiment, the intermediate gear 21 has the long holes 21e and the intermediate gear 22 has the engaging convex sections 22e which engage with the long holes 21e having the predetermined amount of backlash S, and to which the driving force is transmitted from the intermediate gear 21. Then, when the roller section 73 of the detent spring 72 goes from the upper portion of the valley sections 81 to 84 to the valley bottom V, the detent plate 71 and the intermediate gear 22 are swung by the force operating to drop the roller section 73 of the detent spring 72 into the valley bottom V of the valley sections 81 to 84, and thereby the intermediate gear 22 is swung by the predetermined amount of backlash S prior to the rotation of the intermediate gear 21. Then, the ECU 50 is configured such that the positions of the valley bottoms V of the valley sections 81 to 84 are learned, based on the deference between the rotational angle on the detent plate 71 side in a state where the roller section 73 of the detent spring 72 drops into the valley bottom V of the valley sections 81 to 84 and swing of the detent plate 71 is stopped, and the rotational angle on the motor 10 side when the intermediate gear 21 is following-up rotated by the predetermined amount of backlash S. Thus, it is possible to stop the roller section 73 at the position by dropping the roller section 73 into the valley bottom V in advance by the force (biasing force F) operating to drop the roller section 73 of the detent spring 72 into the valley bottom V of the valley section 81 (82 to 84) of the detent plate 71 by appropriately using a relative positional relationship between the long hole 21e and the engaging convex sections 22e which engage to be movable with each other in a range of the predetermined amount of backlash S. Then, the intermediate gear 22 is following-up rotated by the predetermined amount of backlash S and it is possible to grasp an accurate rotational angle range on the motor 10 side until the roller section 73 engages with the intermediate gear 22 to transmit the driving force to the intermediate gear 22 (until the predetermined amount of backlash S is eliminated), in a state where swing of the detent plate 71 and the intermediate gear 22 is stopped by completing movement of the roller section 73 to the valley bottom V of the valley section 81 (82 to 84). As a result, it is possible to reliably learn the position of the valley bottom V of the valley section 81 (82 to 84) in the detent plate 71 and it is possible to appropriately reflect a learning result as a control setting value of the shift apparatus 100.

Furthermore, in the embodiment, the rotor rotational angle sensor 30 that detects the rotational angle of the rotor 11 in the motor 10 and the output shaft rotational angle sensor 40 that detects the rotational angle of the detent plate 71 are provided. Then, the ECU 50 is configured so as to learn the position of the valley bottom V of the valley sections 81 to 84, based on the difference between the rotational angle of the rotor 11 that is detected by the rotor rotational angle sensor 30 which is generated due to the predetermined amount of backlash S and the rotational angle of the detent plate 71 that is detected by the output shaft rotational angle sensor 40. Thus, it is possible to accurately determine the rotational angle (count value) of the rotor 11 corresponding to the position of the valley bottom V of the valley section 81 (82 to 84) in the detent plate 71 by using the rotor rotational angle sensor 30 and the output shaft rotational angle sensor 40. Furthermore, the position of the valley bottom V of the valley section 81 (82 to 84) is learned based on the difference between the rotational angle of the rotor 11 and the rotational angle of the detent plate 71. Thus, an assembly error during manufacturing and an error (backlash between the intermediate gear 22 and the final gear 23) on a mechanical operation included in the speed reduction mechanism section 20 interposed between the motor 10 and the detent plate 71 are taken into account in the position of the valley bottom (learning result) determined by using the rotor rotational angle sensor 30 and the output shaft rotational angle sensor 40, in addition to the predetermined amount of backlash S that is intentionally provided. As a result, it is possible to highly maintain positioning accuracy of the shift position.

Furthermore, in the embodiment, the motor 10 is constituted by the rotor 11 in which N-pole magnets and S-pole magnets are alternately disposed around the shaft pinion 11a. The motor 10 is configured to rotate the rotor 11 such that arrangement of the N-pole magnets and the S-pole magnets around the shaft pinion 11a becomes the same phase state for every 6 conduction steps. Then, the size of the backlash S is set to be equal to or greater than the rotational angle on the motor 10 side corresponding to the 6 conduction steps and less than the rotational angle on the detent plate 71 side corresponding to the valley section having the minimum rotation distance from the valley bottom of the valley section in the valley sections 81 to 84 to the top portion of the mountain section separating the valley sections adjacent to each other. The ECU 50 is configured to determine whether or not the roller section 73 of the detent spring 72 is in a state of being fitted into the valley bottom V of the valley section 81 (82 to 84) by using the predetermined amount of backlash S, based on a result of comparing the rotational angles on the detent plate 71 side respectively corresponding to the rotational angles of the rotor 11 separated from each other by the 6 conduction steps. Thus, even if noise is generated due to leakage flux when the motor 10 is driven, it is possible to compare the rotational angles on the detent plate 71 side in a state where the arrangement becomes the same phase for every 6 conduction steps and thereby it is possible to accurately grasp the change of the rotational angle on the detent plate 71 side regardless of presence or not of the generation of noise. Thus, it is possible to suppress that the accuracy of the determination of whether or not the roller section 73 of the detent spring 72 is in a state of being fitted into the valley bottom V of the valley section 81 (82 to 84) is lowered due to the generation of noise. In addition, it is possible to prevent the roller section 73 of the detent spring 72 from erroneously moving to an adjacent valley section by rotating (swinging) the intermediate gear 22 over the valley section that is a target of learning by setting the predetermined amount of backlash S to the size less than the rotational angle on the detent plate 71 side corresponding to the valley section having the minimum rotation distance from the valley bottom of the valley section in the valley sections 81 to 84 to the top portion of the mountain section 85 separating the valley sections adjacent to each other.

Furthermore, in the embodiment, one phase conduction state corresponding to one conduction step with respect to each of the excitation coil 14a of the U phase, the excitation coil 14b of the V phase, and the excitation coil 14c of the W phase provided in the stator 12 is sequentially switched in order of the U-V conduction, the U-W conduction, the V-W conduction, the V-U conduction, the W-U conduction, and the W-V conduction. Thus, the three-phase motor that is configured so as to rotate the rotor 11 by 15° increment corresponding to the one conduction step is used as the motor 10. Thus, it is possible to easily reduce the size of the shift apparatus 100 (the actuator unit 60) by using the three-phase motor of the surface permanent magnet type (SPM) in which the permanent magnet is incorporated in the surface of the rotor 11. In learning of the position of the valley bottom V of the valley sections 81 to 84, it is possible to perform the learning even if the three-phase motor that is reduced in size is used. In addition, it is possible to reliably perform usual shift switching operation by using the three-phase motor having a strong torque characteristic. As described above, as the actuator of the shift apparatus 100, it is highly effective to use the three-phase motor to which a rotation control type is applied where one phase conduction state corresponding to a single driving step is sequentially switched with respect to the excitation coils 14a to 14c.

Moreover, the embodiment that is disclosed above is an example in all respects and is to be understood as not restrictive. The scope of this disclosure is defined by the appended claims rather than by the description of the embodiment, and includes all modifications within the meaning and range of equivalence of the appended claims.

For example, in the above embodiment, an example in which the long holes 21e are provided in the intermediate gear 21 and the engaging convex sections 22e engaging with the long holes 21e are provided in the intermediate gear 22 is illustrated, but this disclosure is not limited to the embodiment. For example, the engaging convex sections may be provided in the intermediate gear 21 and the long holes may be provided in the intermediate gear 22. Furthermore, the first engagement section of this disclosure is not only the long hole 21e that is passed through but also may have a shape as a concave cam groove having a bottom portion that does not pass through the intermediate gear 21 in the thickness direction.

Furthermore, in the above embodiment, an example in which the long holes 21e of the intermediate gear 21 and the engaging convex sections 22e of the intermediate gear 22 are engaged at two places is illustrated, but this disclosure is not limited to the embodiment. That is, the engagement place of the intermediate gear 21 and the intermediate gear 22 may not be two places described above. It may be one place or three places.

Furthermore, in the above embodiment, an example in which the predetermined amount of backlash S is provided between the intermediate gear 21 and the intermediate gear 22 is illustrated, but this disclosure is not limited to the embodiment. For example, the predetermined amount of backlash S may be provided between the intermediate gear 22 and the final gear 23, and then the position of the valley bottom V of the valley section 81 (82 to 84) may be learned. In this case, the intermediate gear 22 corresponds to the "driving-side member" of this disclosure and the final gear 23 corresponds to the "driven-side member" of this disclosure.

Furthermore, in the above embodiment, an example in which the N position of the detent plate 71 is allowed to be the start point and the position of the valley bottom V of the valley section 81 (82 to 84) is learned by sequentially rotating the detent plate 71 in order of the R position, the P position, and the D position is illustrated, but this disclosure is not limited to the embodiment. The shift position other than the N position is allowed to be the start point and the position of the valley bottom V in each shift position may be learned by sequentially rotating the detent plate 71. Furthermore, learning of the position of the valley bottom corresponding to a specific shift position may be learned without sequential learning of the positions of the valley bottoms corresponding to four shift positions.

Furthermore, in the above embodiment, an example in which as the motor 10, the three-phase motor of the surface permanent magnet type (SPM) in which the permanent magnet is incorporated in the surface of the rotor 11 is used is illustrated, but this disclosure is not limited to the embodiment. For example, a motor of an embedded magnet type (IPM) in which the permanent magnet is embedded in the rotor 11 may be used so that polarities (N-pole and S-pole) of a magnetic pole are switched at equivalent angle intervals (for example, 45° intervals). Furthermore, as the "actuator" of this disclosure, a stepping motor may be used.

Furthermore, in the above embodiment, an example in which the shift apparatus of this disclosure is applied to the shift apparatus for the automobile (the vehicle 110) is illustrated, but this disclosure is not limited to the embodiment. For example, the shift apparatus of this disclosure may be applied to a shift apparatus other than the automobile such as aircrafts and ships.

A shift apparatus according to one aspect of this disclosure is a shift apparatus mounted on a vehicle and includes a shift switching member that includes a plurality of valley sections according to a shift position; a positioning member that is provided to establish the shift position in a state of being fitted into any one of the plurality of valley sections of the shift switching member; an actuator for driving the shift switching member; and a driving force transmission mechanism that includes a driving-side member that is provided on an actuator side and a driven-side member that is provided on a shift switching member side and is rotated according to rotation of the driving-side member, and rotates the shift switching member by transmitting a driving force from the actuator side. The driving-side member and the driven-side member are configured to be able to relatively rotate in an engaged state by a predetermined amount of backlash by providing the predetermined amount of backlash between the driving-side member and the driven-side member, and a position of a valley bottom of the valley section into which the positioning member is fitted is configured to be learned, based on a difference between a rotational angle on the actuator side which is generated due to the predetermined amount of backlash, and a rotational angle on the shift switching member side.

In the shift apparatus according to one aspect of this disclosure, as described above, the driving-side member and the driven-side member are configured to be able to relatively rotate in the engaged state by the predetermined amount of backlash by providing the predetermined amount of backlash between the driving-side member and the driven-side member, and the position of the valley bottom of the valley section into which the positioning member is fitted is configured to be learned, based on the difference between the rotational angle on the actuator side which is generated due to the predetermined amount of backlash, and the rotational angle on the shift switching member side. Thus, it is possible to move the positioning member to the valley bottom of the valley section of the shift switching member by rotating (swinging) the driven-side member by the predetermined amount of backlash (play) that is intentionally provided between the driving-side member and the driven-side member by using a force of depressing the positioning member in a direction in which the shift switching member is fitted into the valley section. Thus, it is possible to learn the position of the valley bottom of the valley section into which the positioning member is fitted without applying an undue load (external force) on the actuator side or the positioning member side. Furthermore, it is possible to individually grasp the position of the valley bottom of the valley section by learning the position of the valley bottom of the valley section into which the positioning member is actually fitted, in the shift apparatus having individual differences such as manufacturing errors. As a result, it is possible to suppress that positioning accuracy of the shift position is lowered while suppressing that durability of the actuator and the shift switching member is lowered.

In the shift apparatus according to the one aspect, it is preferable that the driving-side member has a first engagement section, the driven-side member has a second engagement section that engages with the first engagement section with the predetermined amount of backlash and transmits a driving force from the driving-side member, when the positioning member goes from an upper portion of the valley section to the valley bottom, the shift switching member and the driven-side member are swung by a force operating to drop the positioning member into the valley bottom of the valley section, and thereby the driven-side member is configured to be swung by the predetermined amount of backlash prior to rotation of the driving-side member, and the position of the valley bottom of the valley section is configured to be learned based on a difference between a rotational angle on the shift switching member side in a state where the positioning member is dropped into the valley bottom of the valley section and the swinging of the shift switching member is stopped, and a rotational angle on the actuator side when the driving-side member is follow-up rotated by the predetermined amount of backlash. In such a configuration, it is possible to stop the positioning member at the position by dropping the positioning member into the valley bottom in advance by the force operating to drop the positioning member into the valley bottom of the valley section of the shift switching member by appropriately using a relative positional relationship between the first engagement section and the second engagement section that engage to be movable with each other in the range of the backlash by providing the predetermined amount of backlash (play). Then, the driving-side member is follow-up rotated by the predetermined amount of backlash and it is possible to grasp an accurate rotational angle range on the actuator side until the driving-side member engages with the driven-side member (until the predetermined amount of backlash is eliminated) to transmit the driving force to the driven-side member, in a state where the swinging of the shift switching member and the driven-side member is stopped by completing movement of the positioning member to the valley bottom of the valley section. As a result, it is possible to reliably learn the position of the valley bottom of the valley section in the shift switching member and it is possible to appropriately reflect a learning result as a control setting value of the shift apparatus.

In the shift apparatus according to the one aspect, it is preferable that the actuator is a motor including a rotor and a stator, the actuator further includes a rotor rotational angle sensor detecting a rotational angle of the rotor and an output shaft rotational angle sensor detecting a rotational angle of the shift switching member, and the position of the valley bottom of the valley section is configured to be learned based on a difference between the rotational angle of the rotor detected by the rotor rotational angle sensor, which is generated due to the predetermined amount of backlash and the rotational angle of the shift switching member detected by the output shaft rotational angle sensor. In such a configuration, it is possible to accurately determine the rotational angle of the rotor corresponding to the position of the valley bottom of the valley section in the shift switching member by using the rotor rotational angle sensor and the output shaft rotational angle sensor. Furthermore, the position of the valley bottom of the valley section is learned based on the difference between the rotational angle of the rotor of the actuator and the rotational angle of the shift switching member. Thus, an assembly error during manufacturing and an error (small backlash such as backlash between gear members) on a mechanical operation included in the driving force transmission mechanism interposed between the actuator and the shift switching member are taken into account in the position of the valley bottom (learning result) determined by using the rotor rotational angle sensor and the output shaft rotational angle sensor, in addition to the predetermined amount of backlash that is intentionally provided. As a result, it is possible to highly maintain positioning accuracy of the shift position.

In the shift apparatus according to the one aspect, it is preferable that the actuator is a motor including a rotor in which N-pole magnets and S-pole magnets are alternately disposed around a rotation shaft and a stator that is disposed so as to face the rotor through a gap, in the motor, the rotor is rotated such that arrangement of the N-pole magnets and the S-pole magnets around the rotation shaft becomes the same phase state for every predetermined number of driving steps, the predetermined amount of backlash is set to be equal to or greater than the rotational angle on the motor side corresponding to the predetermined number of driving steps, and less than the rotational angle on the shift switching member side corresponding to the valley section having the minimum rotation distance from the valley bottom of the valley section in the plurality of valley sections to a top portion of a mountain section separating the valley sections adjacent to each other, and the positioning member is configured to determine whether or not it is a state of being fitted into the valley bottom of the valley section by using the predetermined amount of backlash, based on a result of comparison between the rotational angles on the shift switching member side respectively corresponding to the rotational angles of the rotor separated from each other by the predetermined number of driving steps. In such a configuration, even if noise is generated due to leakage flux when the motor is driven, it is possible to compare the rotational angles on the shift switching member side in a state where the arrangement becomes the same phase for every predetermined number of driving steps and thereby it is possible to accurately grasp the change of the rotational angle on the shift switching member side regardless of the presence or absence of generated noise. Thus, it is possible to suppress that the accuracy of the determination of whether or not the positioning member is in a state of being fitted into the valley bottom of the valley section is lowered due to the generation of noise. In addition, it is possible to prevent the positioning member from erroneously moving to an adjacent valley section by rotating the driven-side member over the valley section that is a target of learning by setting the predetermined amount of backlash to be less than the rotational angle on the shift switching member side corresponding to the valley section having the minimum rotation distance from the valley bottom of the valley section in the plurality of valley sections to the top portion of the mountain section separating the valley sections adjacent to each other.

In this case, it is preferable that the motor is a three-phase motor that is configured such that the rotor is rotated by an angle increment corresponding to a single driving step by sequentially switching a one-phase conduction state corresponding to the single driving step with respect to an excitation coil provided in the stator. In such a configuration, it is possible to easily reduce a size of the shift apparatus by using the three-phase motor that is favorable for miniaturization. It is also possible to perform learning of the position of the valley bottom of the valley section by using the three-phase motor that is miniaturized without problems. In addition, it is possible to reliably perform a usual shift switching operation by using the three-phase motor having strong torque characteristics. As described above, as the actuator of the shift apparatus, it is highly effective to use the three-phase motor to which a rotation control system is applied in which the one-phase conduction state, corresponding to the single driving step with respect to the excitation coil, is sequentially switched.

Moreover, in this application, in the shift apparatus according to the one aspect, the following configurations may be considered.

That is, in the shift apparatus further including the output shaft rotational angle sensor, the predetermined amount of backlash is provided on the actuator side rather than the output shaft rotational angle sensor.

In addition, in the shift apparatus further including the rotor rotational angle sensor and the output shaft rotational angle sensor, the rotor rotational angle sensor and the output shaft rotational angle sensor are provided within a housing in which the actuator is accommodated.

In addition, in the shift apparatus according to the one aspect, the shift position includes a P position, an R position, an N position, and a D position, and in each shift position of the P position, the R position, the N position, and the D position, the corresponding position of the valley bottom of the valley section is configured to be learned.

In the shift apparatus further including the rotor rotational angle sensor, the rotor rotational angle sensor is an encoder that outputs a count value corresponding to the rotation amount of the rotor and the position of the valley bottom of the valley section is configured to be learned based on the count value output from the encoder.

In addition, in the shift apparatus according to the one aspect, the driving-side member is rotated by three times or more in forward and reverse directions by using the predetermined amount of backlash provided between the driving-side member and the driven-side member, and the position of the valley bottom of the valley section is configured to be learned based on a measurement result of the difference between the rotational angle on the actuator side and the rotational angle on the shift switching member side in each rotating direction in a second time and subsequent times except a first time.

According to this disclosure, as described above, it is possible to provide the shift apparatus in which lowering of the positioning accuracy of the shift position can be suppressed while suppressing lowering of the durability of the actuator and the shift switching member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift apparatus mounted on a vehicle, the shift apparatus comprising:
   a shift switching member that includes a plurality of valley sections according to a shift position;
   a positioning member that is provided to establish the shift position in a state of being fitted into any one of the plurality of valley sections of the shift switching member;
   an actuator for driving the shift switching member; and
   a driving force transmission mechanism that includes a driving-side member that is provided on an actuator side and a driven-side member that is provided on a shift switching member side and is rotated according to rotation of the driving-side member, and rotates the shift switching member by transmitting a driving force from the actuator side,
   wherein the driving-side member and the driven-side member are configured to be able to relatively rotate in an engaged state by a predetermined amount of backlash by providing the predetermined amount of backlash between the driving-side member and the driven-side member, and a position of a valley bottom of the valley section into which the positioning member is fitted is configured to be learned, based on a difference between a rotational angle on the actuator side which is generated due to the predetermined amount of backlash and a rotational angle on the shift switching member side,
   wherein the actuator is a motor including a rotor in which N-pole magnets and S-pole magnets are alternately disposed around a rotation shaft and a stator that is disposed so as to face the rotor through a gap,
   wherein in the motor, the rotor is rotated such that arrangement of the N-pole magnets and the S-pole magnets around the rotation shaft becomes the same phase state for every predetermined number of driving steps,
   wherein the predetermined amount of backlash is set to be equal to or greater than the rotational angle on the motor side corresponding to the predetermined number of driving steps and less than the rotational angle on the shift switching member side corresponding to the valley section having the minimum rotation distance from the valley bottom of the valley section in the plurality of valley sections to a top portion of a mountain section separating the valley sections adjacent to each other, and
   wherein the positioning member is configured to determine whether or not it is a state of being fitted into the valley bottom of the valley section by using the predetermined amount of backlash, based on a result of comparing between the rotational angles on the shift switching member side respectively corresponding to the rotational angles of the rotor separated from each other by the predetermined number of driving steps.

2. The shift apparatus according to claim 1,
   wherein the driving-side member has a first engagement section,
   wherein the driven-side member has a second engagement section that engages with the first engagement section with the predetermined amount of backlash and transmits a driving force from the driving-side member,
   wherein when the positioning member goes from an upper portion of the valley section to the valley bottom, the shift switching member and the driven-side member are swung by a force operating to drop the positioning member into the valley bottom of the valley section, and thereby the driven-side member is configured to be swung by the predetermined amount of backlash prior to rotation of the driving-side member, and
   wherein the position of the valley bottom of the valley section is configured to be learned based on a difference between a rotational angle on the shift switching member side in a state where the positioning member is dropped into the valley bottom of the valley section and swing of the shift switching member is stopped, and a rotational angle on the actuator side when the driving-side member is following-up rotated by the predetermined amount of backlash.

3. The shift apparatus according to claim 1,
wherein the actuator is a motor including a rotor and a stator,
wherein the actuator further includes a rotor rotational angle sensor detecting a rotational angle of the rotor and an output shaft rotational angle sensor detecting a rotational angle of the shift switching member, and
wherein the position of the valley bottom of the valley section is configured to be learned based on a difference between the rotational angle of the rotor detected by the rotor rotational angle sensor, which is generated due to the predetermined amount of backlash and the rotational angle of the shift switching member detected by the output shaft rotational angle sensor.

4. The shift apparatus according to claim 1,
wherein the motor is a three-phase motor that is configured such that the rotor is rotated by an angle increment corresponding to a single driving step by sequentially switching a one-phase conduction state corresponding to the single driving step with respect to an excitation coil provided in the stator.

* * * * *